United States Patent
Dietrich

(10) Patent No.: US 10,495,033 B2
(45) Date of Patent: Dec. 3, 2019

(54) COMPRESSOR SYSTEM FOR A MOTOR VEHICLE

(71) Applicant: BorgWarner Inc., Auburn Hills, MI (US)

(72) Inventor: Konstantin Dietrich, Mainz (DE)

(73) Assignee: BorgWarner Inc., Auburn Hills, MI (US)

( * ) Notice: Subject to any disclaimer, the term of this patent is extended or adjusted under 35 U.S.C. 154(b) by 234 days.

(21) Appl. No.: 15/555,574

(22) PCT Filed: Feb. 29, 2016

(86) PCT No.: PCT/US2016/020003
§ 371 (c)(1),
(2) Date: Sep. 5, 2017

(87) PCT Pub. No.: WO2016/140898
PCT Pub. Date: Sep. 9, 2016

(65) Prior Publication Data
US 2018/0051659 A1    Feb. 22, 2018

(30) Foreign Application Priority Data

Mar. 5, 2015   (DE) .................. 10 2015 203 986

(51) Int. Cl.
*F02M 26/06*   (2016.01)
*F02M 26/19*   (2016.01)
(Continued)

(52) U.S. Cl.
CPC ............ *F02M 26/06* (2016.02); *F02M 26/19* (2016.02); *F02M 26/41* (2016.02); *F02M 35/10222* (2013.01)

(58) Field of Classification Search
CPC ........ F02M 26/06; F02M 26/19; F02M 26/41; F02M 35/10222
(Continued)

(56) References Cited

U.S. PATENT DOCUMENTS 4,179,892 A * 12/1979 Heydrich ............... F02M 26/05
60/605.2
6,363,721 B1 * 4/2002 Prenninger ............. F02B 39/10
60/611
(Continued)

FOREIGN PATENT DOCUMENTS

DE    202013009087 U1    11/2013
DE    102013003418 A1    8/2014
(Continued)

OTHER PUBLICATIONS

An English Machine Translation of Greiner et al. (Pub. No. DE 10 2013 003 418 A1), published on Aug. 28, 2014.*
(Continued)

*Primary Examiner* — Thai Ba Trieu
(74) *Attorney, Agent, or Firm* — Eric L. Doyle; Stephen A. Pendorf; Patent Central LLC

(57) ABSTRACT

A compressor system (1) for a motor vehicle, with a compressor (2) having a driven compressor wheel (3) for compressing intake air for an internal combustion engine (9) of the motor vehicle, an intake section (6) extending along a first axis (11) for guiding air to the compressor wheel (3), and an exhaust gas recirculation line (8) extending along a second axis (12) for recirculating exhaust gas from the internal combustion engine (9) into the intake section (6). The intake section (6) has a first diameter (10) in the area of the opening of the recirculation line (8). The recirculation line (8) opens eccentrically into the intake section (6).

18 Claims, 6 Drawing Sheets

(51) Int. Cl.
*F02M 26/41* (2016.01)
*F02M 35/10* (2006.01)

(58) Field of Classification Search
USPC .............. 60/605.2, 605.1, 611; 123/568.17
See application file for complete search history.

(56) References Cited

U.S. PATENT DOCUMENTS

| | | | | |
|---|---|---|---|---|
| 6,675,579 | B1 * | 1/2004 | Yang | F02B 29/0418 60/605.2 |
| 6,810,867 | B2 * | 11/2004 | Schmid | F02M 26/19 123/568.17 |
| 7,721,542 | B2 * | 5/2010 | Chen | F02M 26/07 123/568.17 |
| 7,793,500 | B2 * | 9/2010 | Igarashi | F02D 41/0007 60/605.2 |
| 9,828,922 | B2 * | 11/2017 | Kemmerling | F02M 26/06 |
| 2007/0271920 | A1 * | 11/2007 | Marsal | F02M 26/06 60/605.2 |

FOREIGN PATENT DOCUMENTS

| | | | |
|---|---|---|---|
| DE | 202014103795 U1 | 8/2014 | |
| DE | 102017209598 A1 * | 5/2018 | ............. F02M 26/09 |
| JP | 2004100653 A | 4/2004 | |
| JP | 2009167952 A * | 7/2009 | |

OTHER PUBLICATIONS

An English Machine Translation of Stieglbauer et al. (Pub. No. DE 20 2013 009 087 U1), published on Jan. 9, 2014.*
Written Opinion and International Search Report dated Jun. 9, 2016, in International Application No. PCT/US2016/020003.
Chinese Office Action (with English language translation) dated Jan. 30, 2019, in Chinese Application No. 201680011516.3.

* cited by examiner

A - A

COMPRESSOR SYSTEM FOR A MOTOR VEHICLE

BACKGROUND OF THE INVENTION

Field of the Invention

The invention relates to a compressor system for a motor vehicle comprising an exhaust gas recirculation.

Description of the Related Art

The publication DE 10 2013 106 A1 shows a corresponding system comprising a compressor and exhaust gas recirculation according to the preamble.

It is the object of the present invention to specify a compressor system which has a high compressor efficiency at a good mixing of the recirculated exhaust gas with the intake air.

BRIEF SUMMARY OF THE INVENTION

The solution to this problem is carried out by the features of the independent claim. The subclaims have advantageous embodiments of the invention as their subject matter. The subclaims may be combined with each other in any technologically logical way, by which means effects may occasionally result which extend beyond the sum of the individual effects.

Thus, the invention is solved by a compressor system for a motor vehicle. The compressor system comprises a compressor with a driven compressor wheel. The compressor wheel functions to compress the intake air. The compressed air is supplied to an internal combustion engine of the motor vehicle. The drive of the compressor wheel is carried out, for example, via a turbine wheel in connection with an exhaust gas turbocharger or, for example, by means of an electric machine.

The compressor system further comprises an intake section; this intake section guides the surrounding air to the compressor wheel. An exhaust gas recirculation line is also provided. This exhaust gas recirculation line guides exhaust gas of the internal combustion engine into the intake section. The recirculated exhaust gas is thus mixed in upstream of the compression of the intake air. The invention provides that the exhaust gas recirculation line opens eccentrically into the intake section.

As per definition, the intake section extends along a first axis. The exhaust gas recirculation line extends along a second axis. The axes are respectively defined in the center of the intake section or the exhaust gas recirculation line and do not have to represent straight lines, but instead follow the curved configuration of the intake section or the exhaust gas recirculation line. Within the scope of the invention, a section and a line are discussed, wherein in particular rigid pipes, flexible pipes, hoses, or channels are comprised thereby. Within the scope of this invention, the "diameter" is always defined as the inner diameter. The "distance" always defines the shortest distance.

Over many trials and calculations, it was determined that a good mixing of the intake fresh air with the recirculated exhaust gas increases the efficiency of the exhaust gas recirculation system on the one hand and results in an improved temperature distribution in the area of the compressor on the other. (A corresponding simulation result is explained in conjunction with FIG. 7.) According to the invention, the compressor generates a volume flow with a very uniform temperature distribution and uniform speed, through which means the efficiency of the compressor increases. Within the context of the development of this compressor system, it was determined that the eccentric opening of the exhaust gas recirculation line and thus the eccentric or tangential introduction of the exhaust gas into the fresh air flow resulted in less turbulence and simultaneously to a better mixing of the two volume flows.

The intake section has a first diameter in the area of the opening of the exhaust gas recirculation line. The eccentric connection of the exhaust gas recirculation line may be defined as a function of the first diameter: thus it is preferably provided that a first distance between the first axis and the second axis is at least 10%, preferably at least 15%, and particularly preferably at least 20% of the first diameter. When defining the first distance, the second axis is extended in a straight line across the opening of the exhaust gas recirculation line such that the first distance is measurable as the shortest distance (perpendicular) between the two axes. The larger the first distance, the greater the eccentricity of the arrangement of the opening at the intake section, and thus the greater efficiency with which the exhaust gas volume flow is transferred into the fresh air volume flow.

If the intake section and the exhaust gas recirculation line are considered in the area of the opening in a segment perpendicular to the first axis, then there is an outer wall of the exhaust gas recirculation line which is spaced at a farthest possible distance from the first axis. It is preferably provided that a second distance between this outer wall and the first axis is at least 30%, preferably at least 40%, particular preferably at least 45% of the first diameter of the intake section. When the structural conditions allow, this is extended to a second distance of up to 50% of the first diameter, wherein the maximal eccentric arrangement is then reached.

Preferably, a third distance is defined between the intake-side end of the compressor wheel and the second axis, wherein the second axis at the opening is decisive here. The third distance is advantageously at least 25%, preferably at least 50%, particularly preferably at least 100% of the first diameter. By this means, a sufficient distance of the opening area from the compressor is defined and it ensures that the fresh air flow and the exhaust gas flow may be sufficiently mixed upstream of the compressor wheel. By this means, the most homogeneous temperature distribution in the compressor is achieved.

At the intake-side end of the compressor wheel, a second diameter is defined in the intake section. The first diameter (at the opening of the exhaust gas recirculation line) is larger than the second diameter (at the compressor wheel). The intake section thus tapers from the opening of the exhaust gas recirculation line in the direction of the compressor. It is particularly provided that the second diameter is at least 90% of the first diameter. In addition, it is preferably provided that the intake section has a third diameter upstream of the opening, wherein the third diameter is larger than the first diameter.

Due to this taper in the flow direction, the flow speed increases in the direction of the compressor. The opening of the exhaust gas recirculation line is positioned at a corresponding point so that an optimal mixing of the two volume flows occurs under consideration of the flow speed in the intake section and the flow speed in the exhaust gas recirculation line.

It is preferably provided that the flow in the intake section and the flow in the exhaust gas recirculation line meet each other at an angle >90°. By this means, locally limited turbulences occur between the two flows and as a result lead to a better mixing. This is achieved in particular in that the intake section is curved in the area of the opening, wherein the exhaust gas recirculation line opens into the convex side of the curved intake section.

It is further preferred that an orifice is arranged in the exhaust gas recirculation line at the opening to influence the flow speed.

It is additionally preferably provided that the exhaust gas recirculation line has an oval cross section in the area of the opening. The oval cross section is thereby defined by a large axes and a small axis perpendicular to the large axis. The large axis of the oval cross section is arranged along, in particular parallel to, the flow direction in the intake section. In particular, the large axis is approximately parallel to the first axis. Within the scope of the invention, it was recognized that the recirculated exhaust gas is to be introduced into the intake section relatively far outward in the radial direction. This is also achieved by the oval cross section, in addition to the eccentric arrangement.

It is particularly preferably provided that a length of the large axis of the oval cross section is at least 120%, preferably at least 130%, particularly preferably at least 150% of a length of the small axis. In particular, a significant effect during mixing of the two volume flows is observed in the case of an oval configuration comprising a large axis which is substantially longer than the small axis.

It is additionally preferably provided that the exhaust gas recirculation line opens eccentrically in the direction of rotation of the compressor wheel. The exhaust gas recirculation line is thus arranged eccentrically in such a way that the exhaust gas is transferred into the intake section in the direction of rotation of the compressor wheel. The flow in the intake section rotates upstream of the compressor wheel in the direction of rotation of the compressor wheel. In order to promote this direction of rotation even more, and to avoid negative influences, the exhaust gas recirculation line opens eccentrically in the direction of rotation.

It is further preferably provided that the intake section is arranged to flow axially past the compressor wheel. In particular, the compressor wheel is arranged in a compressor housing. The intake section is flange mounted on an axial side of the compressor wheel such that the flow is axially past the compressor wheel. The compressor wheel thereby compresses radially toward the outside. At least one flow in the compressor housing is preferably arranged radially outside of the compressor wheel. This flow leads to the internal combustion engine.

It is additionally preferably provided that the compressor wheel is a component of an exhaust gas turbocharger. This exhaust gas turbocharger comprises a turbine wheel, which is drive-connected to the compressor wheel via a shaft. The turbine wheel is driven by means of exhaust gas from the internal combustion engine.

It is additionally preferably provided that the compressor wheel is driven by means of an electric machine. An electric machine may be thereby used instead of the turbine wheel. However, it is also provided that an electric machine is arranged within the exhaust gas turbocharger, wherein the compressor wheel may be driven by means of the turbine and/or the electric machine.

BRIEF DESCRIPTION OF THE SEVERAL VIEWS OF THE DRAWINGS

Additional details, advantages, and features of the present invention arise from the subsequent description of embodiments with reference to the drawings.

DETAILED DESCRIPTION OF THE INVENTION

A compressor system 1 will be subsequently described on the basis of two embodiments. Identical or functionally identical components are provided with the same references numerals in the two embodiments. The figures show compressor system 1 in a schematically simplified way.

Figure 1:
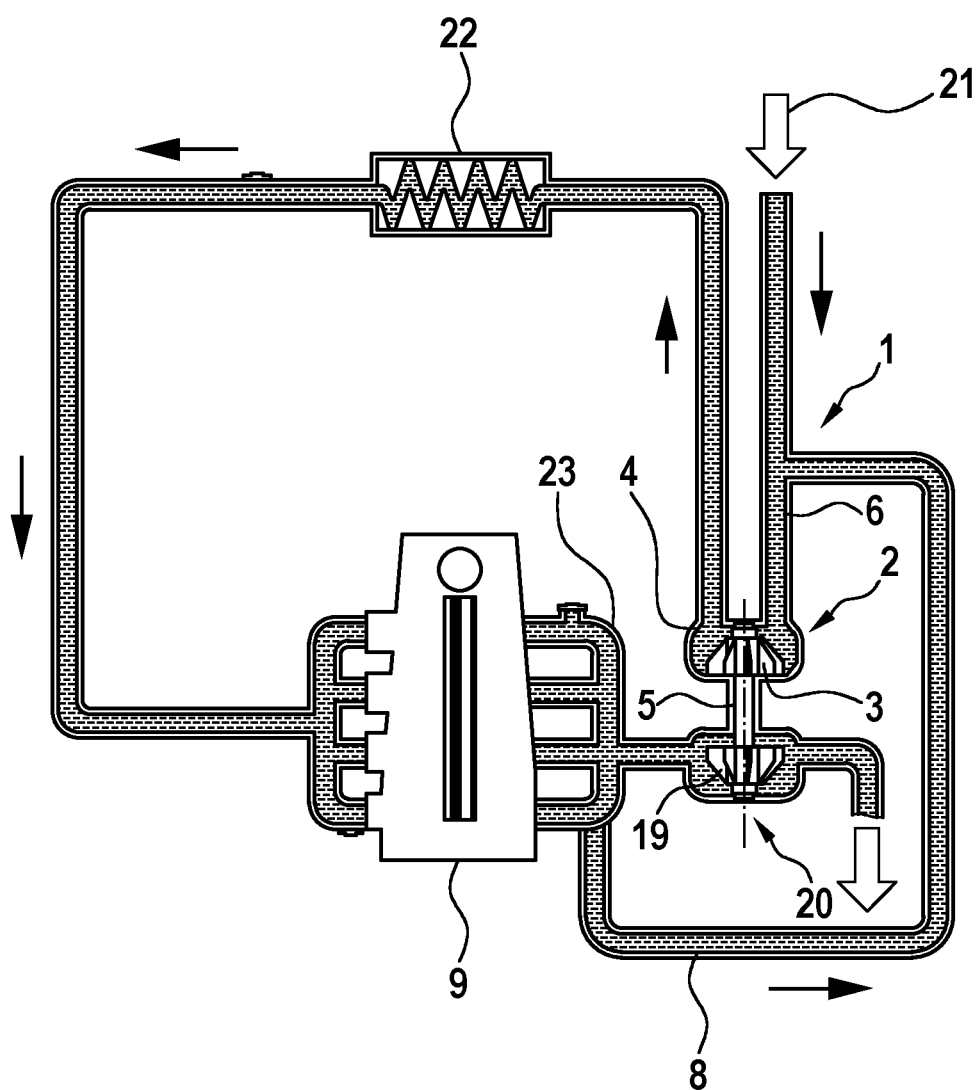
FIGS. 1, 2 show schematic views of a system with low-pressure exhaust gas recirculation and a compressor system according to the invention according to all embodiments.

FIG. 1 shows, in a schematically simplified way, an arrangement comprising a low-pressure exhaust gas recirculation comprising an internal combustion engine 9 and compressor system 1. Compressor system 1 comprises a compressor 2. Compressor 2 in turn comprises a compressor wheel 3. Compressor wheel 3 is arranged in a compressor housing 4. An intake section 6 is flange-mounted axially on compressor housing 4. Surrounding air is sucked in via this intake section 6 and compressed by compressor wheel 3.

As shown in FIG. 1, compressor 2 is a component of an exhaust gas turbocharger 20. In exhaust gas turbocharger 20, compressor wheel 3 is connected rotationally fixed to a shaft 5. A turbine wheel 19 of exhaust gas turbocharger 20 is located at the diametrically opposite end of shaft 5.

Fresh air 21 is sucked in via intake section 6 in the direction of compressor 2. Upstream of compressor 2, an exhaust gas 8 opens eccentrically into intake section 6. In compressor 2, fresh air 21 is compressed with the admixed exhaust gas and supplied via an optional charge air cooler 22 to internal combustion engine 9. Exhaust gas recirculation line 8 branches off of the exhaust gas manifold routing 23 of internal combustion engine 9.

Figure 2:
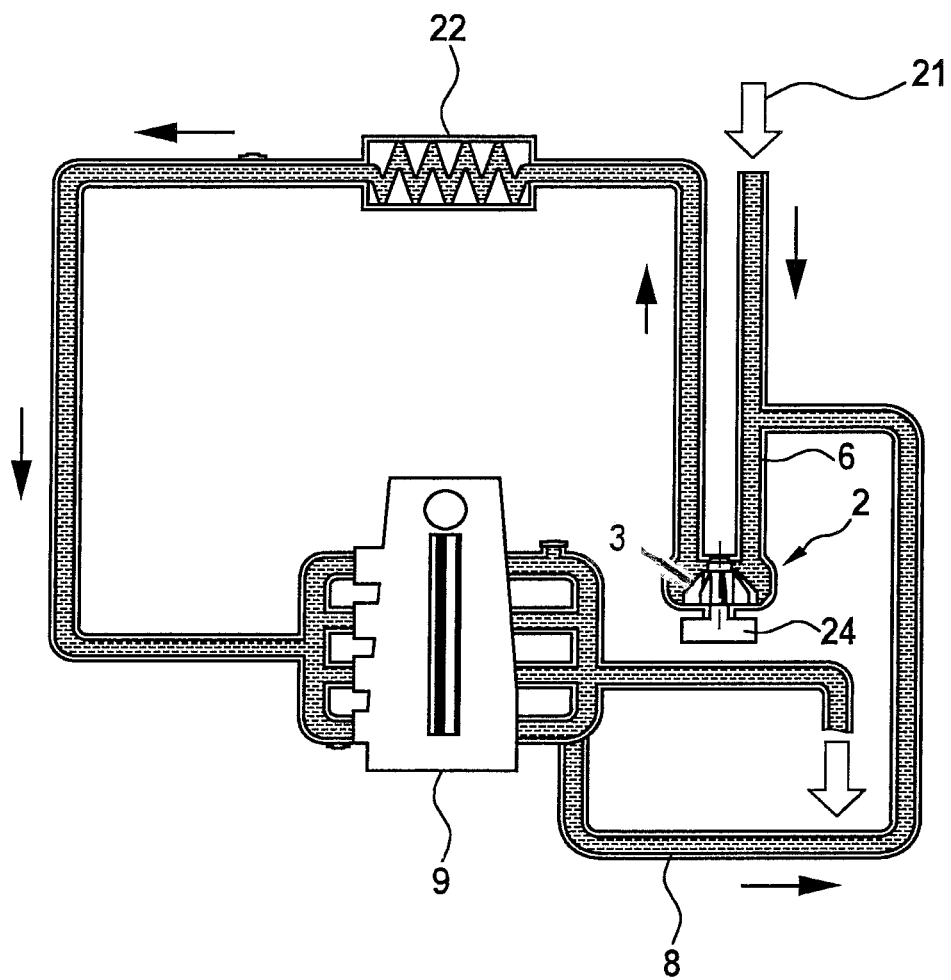

FIG. 2 shows an alternative configuration of the system from FIG. 1. According to FIG. 2, compressor system 1 is not a component of an exhaust gas turbocharger. According to FIG. 2, compressor wheel 3 is driven by means of an electric machine 24.

Figure 3:
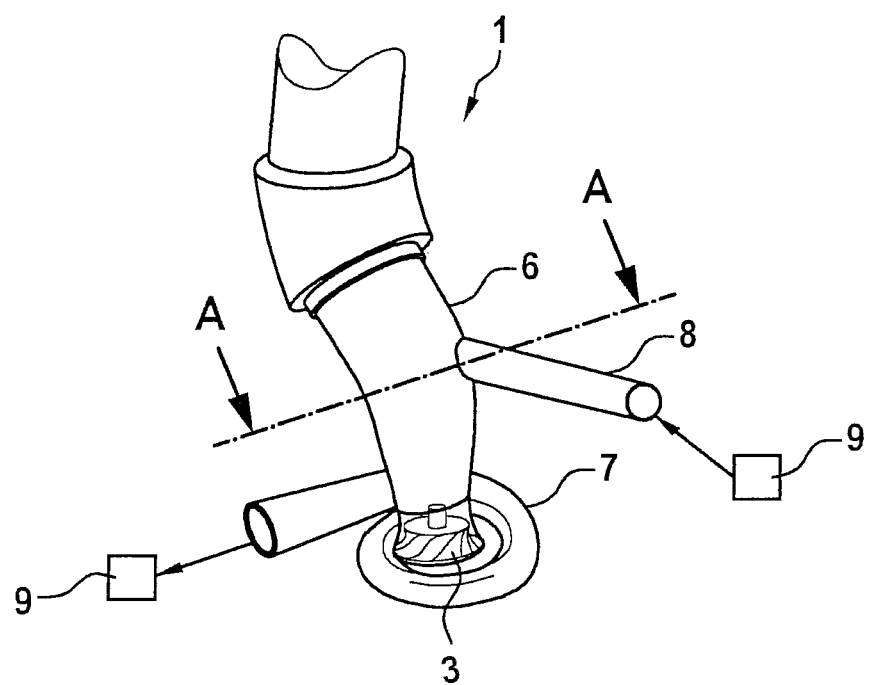
FIG. 3 shows the compressor system according to the invention according to a first embodiment.

FIG. 3 shows compressor system 1 from the first embodiment in a perspective view. Internal combustion engine 9 of the vehicle is thereby indicated purely schematically. On the basis of this representation, it is clear that exhaust gas is guided from internal combustion engine 9 into intake section 6 via exhaust gas recirculation line 8. Further, FIG. 3 shows that the air compressed by compressor 2 is supplied again to internal combustion engine 9.

As shown in FIG. 3, exhaust gas recirculation line 8 opens eccentrically into intake section 6, such that a tangential flow of the exhaust gas into the intake section occurs. Exactly this area of the opening is depicted in sectional view A:A in FIG. 4.

Figure 6:
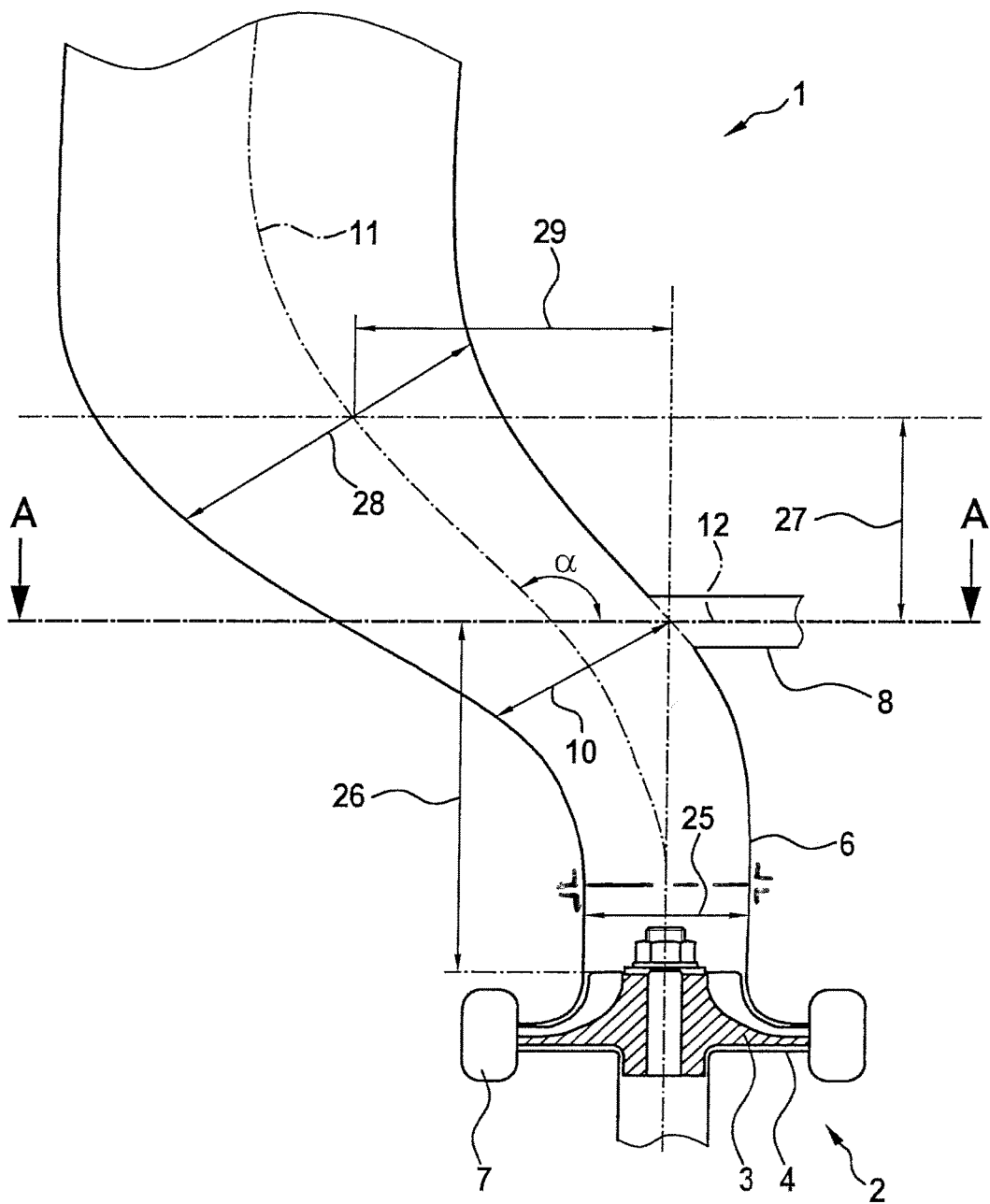
FIG. 6 shows a compressor system according to the invention according to all embodiments.

At the opening, intake section 6 has a first diameter 10 (see FIG. 6). The diameter of exhaust gas recirculation line 8 at the opening is substantially smaller than the first diameter.

A first axis 11 is defined in intake section 6. A second axis 12 is defined in exhaust gas recirculation line 8. First axis 11 is spaced apart from second axis 12 at a first distance 15.

Figure 4:
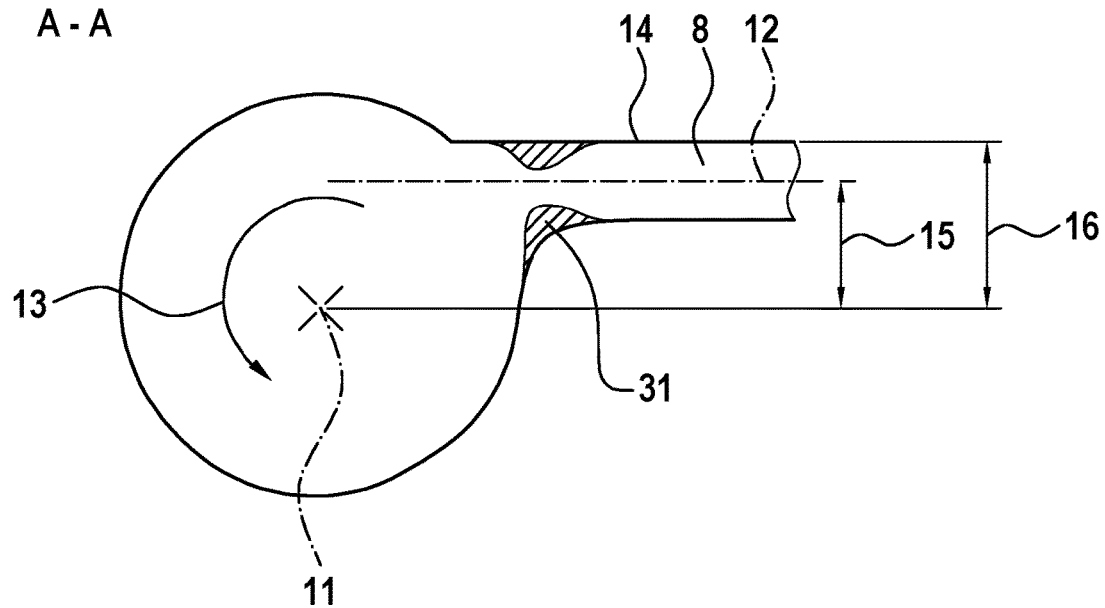
FIG. 4 shows a sectional view through the compressor system according to the invention according to the first embodiment.

FIG. 4 further shows an outer wall 14 of exhaust gas recirculation line 8. A second distance 16 is defined between first axis 11 and this outer wall 14.

The previously described positive effect of the eccentric opening of exhaust gas recirculation line 8 is maximally large in the case of a maximally eccentric arrangement of the opening. Accordingly, the two distances 15, 16 are selected to be as large as possible in order to arrange exhaust gas recirculation line 8 as eccentrically as possible.

FIG. 4 additionally shows a direction of rotation 13 of compressor wheel 3. On the basis of the depiction in FIG. 4, it is clear that exhaust gas recirculation line 8 is arranged eccentrically in such a way that the recirculated exhaust gas is transferred into intake section 6 in direction of rotation 13.

FIG. 4 shows an optional orifice 31 in exhaust gas recirculation line 8 at the opening. By means of orifice 31, the exhaust gas volume flow is correspondingly changed in order to achieve a better mixing with the fresh air, e.g. by means of an increased speed.

Figure 5:
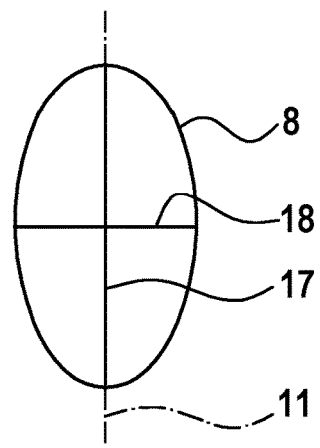
FIG. 5 shows a cross section through an exhaust gas recirculation line of the compressor system according to the invention according to a second embodiment.

In the first embodiment according to FIGS. 3 and 4, exhaust gas recirculation line 8 has a round cross section. According to the second embodiment, as is depicted in FIG. 5, exhaust gas recirculation line 8 has an oval cross section.

The oval cross section has a large axis 17 and a small axis 18. Large axis and small axis 17, 18 are perpendicular to each other. Large axis 17 of the oval cross section is arranged in the direction of the flow in intake section 6. As is schematically depicted in FIG. 5, large axis 17 thus extends approximately parallel to first axis 11. The point of intersection of large and small axes 17, 18 lies on second axis 12.

FIG. 6 shows a cross-sectional view of compressor system 1 for both embodiments. First axis 11 thereby lies in the sectional plane. Second axis 12, likewise depicted, lies behind the sectional plane. FIG. 6 shows how different dimensions of compressor system 1 are defined. At the opening of exhaust gas recirculation line 8, intake section 6 has first diameter 10. At an intake-side end of compressor wheel 3, intake section 6 has a second diameter 28. The diameters are always measured perpendicular to first axis 11.

The two flows meet with each other at the opening at an angle α. Correspondingly, first axis 11 and second axis 12 have angle α to each other. Angle α is greater than 90°, preferably greater than 95°.

Second axis 12 at the opening is spaced apart from the intake-side end of compressor wheel 3 at a third distance 26.

A fourth distance 27 is defined upstream of second axis 12.

Third diameter 28 is measured at a point of first axis 11 which is spaced apart from second axis 12 by fourth distance 27. The taper of intake section 6 is preferably defined as follows: second diameter 25 is at most 95% of first diameter 10. Third diameter 28 is preferably at least 110% of first diameter 10.

FIG. 6 further shows a curve of intake section 6, wherein exhaust gas recirculation line 8 opens into the convex side of the curve. The curve is defined in this case by an offset length 29. Offset length 29 is measured perpendicular to the axis of compressor wheel 3. At fourth distance 27, first axis 11 is spaced apart from the axis of compressor wheel 3 by offset length 29. Offset length 29 is preferably at least 50% of first diameter 10.

As has already been described, the tapered configuration of intake section 6 changes the flow speed of inflowing fresh air 21. The opening of exhaust gas recirculation line 8 is carried out at first diameter 10 and thus at a position at which the flow speed of fresh air 21 is optimal for admixing the recirculated exhaust gas. Angle α between the two flows thereby enables an optimal mixing of the two flows due to locally limited turbulences. In the embodiment shown, angle α>90° is achieved by the correspondingly curved configuration of intake section 6.

Figure 7:
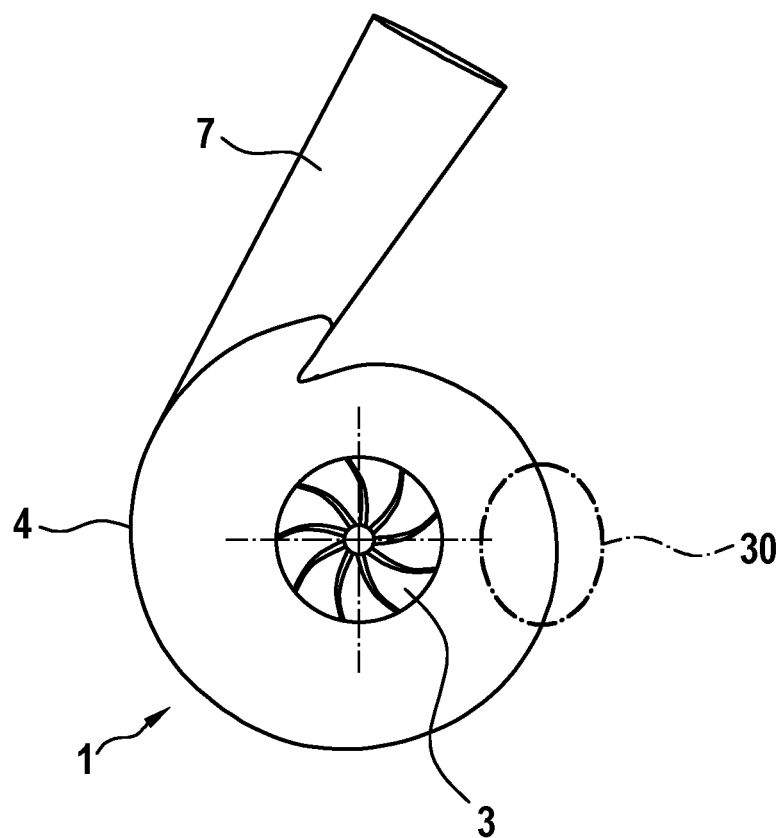
FIG. 7 shows a representation of the compressor system to explain a simulation result.

A simulation result is explained on the basis of FIG. 7. FIG. 7 shows compressor wheel 3 with compressor housing 4. Volute 7 is designed in compressor housing 4. The supply of compressed air to internal combustion engine 9 is carried out via this volute 7. In simulation calculations, it was determined that increased temperatures occur in the indicated hotspot region 30 in conventional, that is not-inventive, arrangements of the exhaust gas recirculation line. The simulation thereby shows temperatures in hotspot region 30 of up to 400 K, wherein the temperature is at most 330 K outside of hotspot region 30.

The same simulation was carried out using the eccentric arrangement of exhaust gas recirculation line 8 according to the invention. The temperature was thereby at most 350 K in hotspot region 30 and at most 335 K outside of hotspot region 30. Thus, this simulation was able to show that a significantly better temperature distribution occurred using the configuration of compressor system 1 according to the invention. By this means, the efficiency of the compressor increases and component load drops.

In addition to the preceding written description of the invention, reference is hereby made explicitly to the graphic representation of the invention in FIGS. 1 through 7 as a supplemental disclosure thereto.

LIST OF REFERENCE NUMERALS

1 Compressor system
2 Compressor
3 Compressor wheel
4 Compressor housing
5 Shaft
6 Intake section
7 Volute
8 Exhaust gas recirculation line
9 Internal combustion engine
10 First diameter
11 First axis
12 Second axis
13 Direction of rotation
14 Outer wall
15 First distance
16 Second distance
17 Large axis
18 Small axis
19 Turbine wheel
20 Exhaust gas turbocharger
21 Fresh air
22 Charge air cooler
23 Exhaust gas manifold
24 Electric machine
25 Second diameter
26 Third distance
27 Fourth distance 28 Third diameter
29 Offset length
30 Hotspot region
31 Orifice
α Angle

The invention claimed is:

1. A compressor system (1) for a motor vehicle, comprising:
- a compressor (2) comprising a driven compressor wheel (3) for compressing intake aft for an internal combustion engine (9) of the motor vehicle;
- an intake section (6) extending along a first axis (11) for guiding the air to the compressor wheel (3); and
- an exhaust gas recirculation line (8) extending along a second axis (12) for recirculating exhaust gas from the internal combustion engine (9) into the intake section (6) via an opening of the exhaust gas recirculation line (8);
- wherein the intake section (6) has a first diameter (10) in the area of the opening of the exhaust gas recirculation line (8);
- wherein the exhaust gas recirculation line (8) opens eccentrically into the intake section (6); and
- wherein a first distance (15) between the first axis (11) and the second axis (12) is at least 10%, of the first diameter (10).

2. The compressor system according to claim 1, wherein a third distance (26) between the intake-side end of the compressor wheel (3) and the second axis (12) is at least 25% of the first diameter (10).

3. The compressor system according to claim 2, wherein the intake section (6) has a second diameter (25) at the intake-side end of the compressor wheel (3), wherein the first diameter (10) is larger than the second diameter (25).

4. The compressor system according to claim 1, wherein the intake section (6) is curved in the area of the opening and the exhaust gas recirculation line (8) opens into the convex side of the curved intake section (6).

5. The compressor system according to claim 1, wherein the exhaust gas recirculation line (8) opens eccentrically in the rotation of direction (13) of the compressor wheel (3) such that the exhaust gas is transferred into the intake section (6) in the direction of rotation (13).

6. The compressor system according to claim 1, wherein an orifice (31) is arranged in the exhaust gas recirculation line (8) at the opening.

7. The compressor system according to claim 1, wherein the intake section (6) is arranged to flow axially past the compressor wheel (3).

8. The compressor system according to claim 1, wherein a turbine wheel driven by exhaust gas from the internal combustion engine (9), and wherein the turbine wheel is drive-connected to the compressor wheel (3) via a shaft (5).

9. The compressor system according to claim 1, wherein an electric machine (24) is coupled to a shaft of the compressor (2) for driving the compressor wheel (3).

10. The compressor system according to claim 1, wherein a first distance (15) between the first axis (11) and the second axis (12) is at least 15% of the first diameter (10).

11. The compressor system according to claim 1, wherein a first distance (15) between the first axis (11) and the second axis (12) is at least 20% of the first diameter (10).

12. The compressor system according to claim 1, wherein, in a section perpendicular to the first axis (11), an outer wall (14) of the exhaust gas recirculation line (8) has a second distance (16) to the first axis (11), and wherein the second distance (16) is at least 40% of the first diameter (10) of the intake section (6).

13. The compressor system according to claim 1, wherein, in a section perpendicular to the first axis (11), an outer wall (14) of the exhaust gas recirculation line (8) has a second distance (16) to the first axis (11), and wherein the second distance (16) is at least 45% of the first diameter (10) of the intake section (6).

14. The compressor system according to claim 1, wherein a third distance (26) between the intake-side end of the compressor wheel (3) and the second axis (12) is at least 50% of the first diameter (10).

15. The compressor system according to claim 1, wherein a third distance (26) between the intake-side end of the compressor wheel (3) and the second axis (12) is at 100% of the first diameter (10).

16. A compressor system (1) for a motor vehicle, comprising:
- a compressor (2) comprising a driven compressor wheel (3) for compressing intake aft for an internal combustion engine (9) of the motor vehicle;
- an intake section (6) extending along a first axis (11) for guiding the air to the compressor wheel (3); and
- an exhaust gas recirculation line (8) extending along a second axis (12) for recirculating exhaust gas from the internal combustion engine (9) into the intake section (6) via an opening of the exhaust gas recirculation line (8);
- wherein the intake section (6) has a first diameter (10) in the area of the opening of the exhaust gas recirculation line (8);
- wherein the exhaust gas recirculation line (8) opens eccentrically into the intake section (6); and
- wherein, in a section perpendicular to the first axis (11), an outer wall (14) of the exhaust gas recirculation line (8) which is spaced at a distance from the first axis has a second distance (16) to the first axis (11), and wherein the second distance (16) is at least 30% of the first diameter (10) of the intake section (6).

17. A compressor system (1) for a motor vehicle, comprising:
- a compressor (2) comprising a driven compressor wheel (3) for compressing intake air for an internal combustion engine (9) of the motor vehicle;
- an intake section (6) extending along a first axis (11) for guiding the air to the compressor wheel (3); and
- an exhaust gas recirculation line (8) extending along a second axis (12) for recirculating exhaust gas from the internal combustion engine (9) into the intake section (6) via an opening of the exhaust gas recirculation line (8);
- wherein the intake section (6) has a first diameter (10) in the area of the opening of the exhaust gas recirculation line (8);
- wherein the exhaust gas recirculation line (8) has an oval cross section at the opening thereof; and
- wherein the oval cross section is defined by a large axis (17) and a small axis (18), wherein the large axis (17) extends in the flow direction of the flow in the intake section (6).

18. The compressor system according to claim 17, wherein a length of the large axis (17) is at least 120% of a length of the small axis (18).

* * * * *